(12) United States Patent
Schlegel et al.

(10) Patent No.: US 6,439,506 B1
(45) Date of Patent: Aug. 27, 2002

(54) VENTILATION VALVE WITH A BREATHING CHANNEL FOR A TANK CONTAINER OF A HELICOPTER

(75) Inventors: Werner Schlegel, Markt Schwaben; Klaus Wojatschek, Arget, both of (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 09/663,718

(22) Filed: Sep. 15, 2000

(30) Foreign Application Priority Data

Sep. 15, 1999 (DE) .......................... 199 44 124

(51) Int. Cl.⁷ .......................... B64D 37/00; B64D 37/32
(52) U.S. Cl. .................. 244/135 R; 137/519.5; 137/202
(58) Field of Search .................. 244/135 R, 135 C, 244/121; 137/202, 430, 519.5; 417/307, 311

(56) References Cited

U.S. PATENT DOCUMENTS

| 3,871,403 A | * | 3/1975 | Grose |
| 4,104,004 A | * | 8/1978 | Graef |
| 4,524,794 A | * | 6/1985 | Haines |
| 4,991,615 A | * | 2/1991 | Szlaga et al. |
| 5,538,403 A | * | 7/1996 | Black |
| 5,738,304 A | * | 4/1998 | Tavano |

FOREIGN PATENT DOCUMENTS

| DE | 3116719 | 11/1982 |
| DE | 19844264 | 12/1999 |

\* cited by examiner

Primary Examiner—Charles T. Jordan
Assistant Examiner—T. Dinh
(74) Attorney, Agent, or Firm—W. F. Fasse; W. G. Fasse

(57) ABSTRACT

A ventilation valve cooperating with a breathing channel for a fuel tank of a helicopter has a safety device arranged in a valve housing of the ventilation valve. To seal the breathing channel from the tank when a connection between the fuselage cell and the tank is released or disrupted, e.g. in a crash, the safety device includes a spring-loaded plunger (15), a retainer (22), and a movable seal element (10). To allow the tank container to be filled essentially full, and to ensure the ongoing reliable functioning of the breathing channel, the seal element (10) is a buoyant valve ball (10) that seals the breathing channel (81) of the fuel extraction or discharge tank (4) if the fuel level (711) in the tank (4) rises up into the valve (8). Also, the breathing channel (81) is connected with the breathing channel (71) of a main fuel tank (3) by a connecting channel (9).

13 Claims, 3 Drawing Sheets

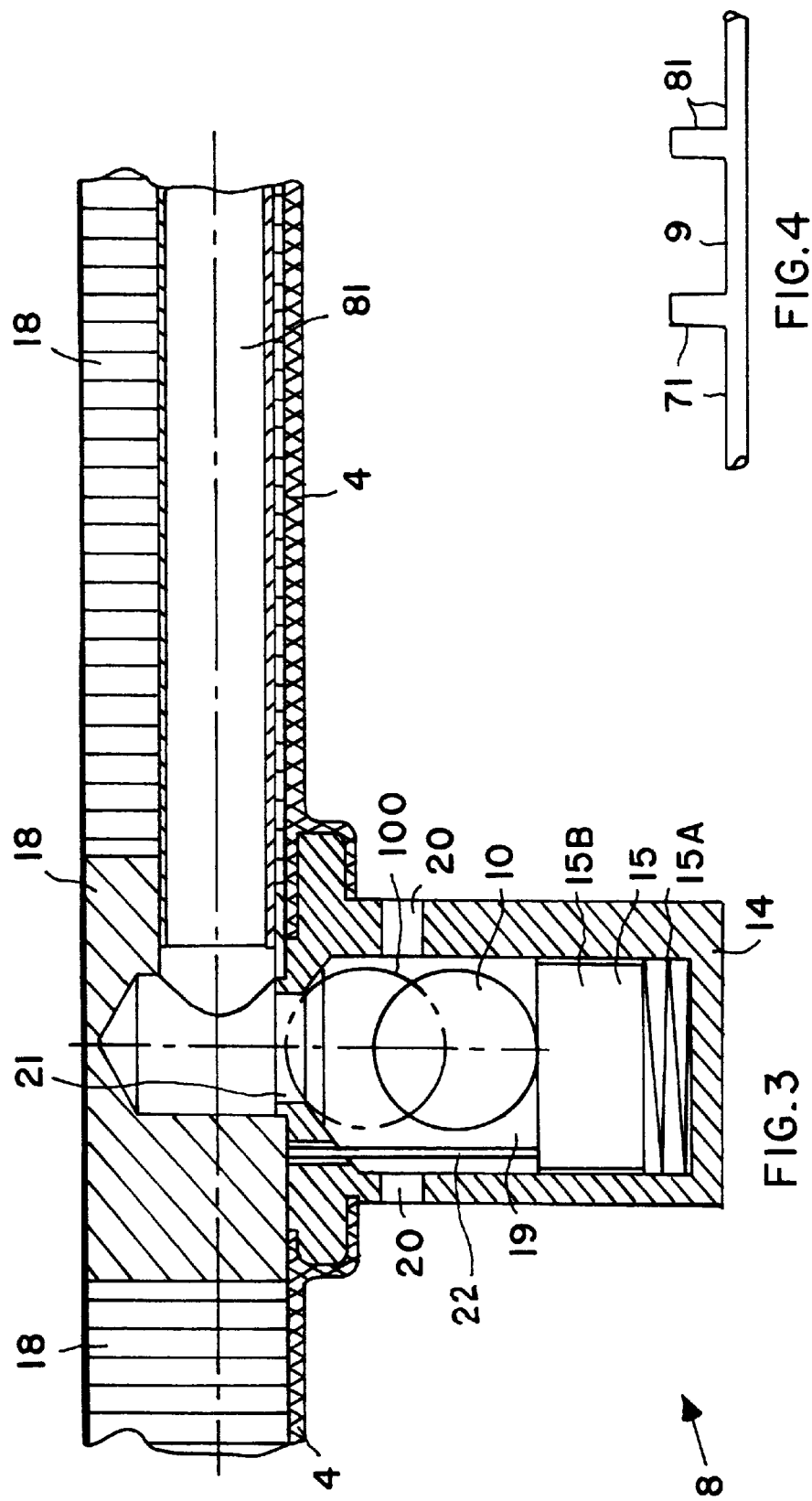

VENTILATION VALVE WITH A BREATHING CHANNEL FOR A TANK CONTAINER OF A HELICOPTER

PRIORITY CLAIM

This application is based on and claims the priority under 35 U.S.C. §119 of German Patent Application 199 44 124.3, filed on Sep. 15, 1999.

FIELD OF THE INVENTION

The invention relates to a ventilation valve with a breathing channel for a tank container and particularly a fuel tank of a helicopter. The ventilation valve contains a device to seal the breathing channel from the tank when a connecting means between the fuselage cell (especially the floor) and the tank container is loosened (as a result of a crash), whereby the device is arranged in a valve housing of the ventilation valve and has a movable seal element.

BACKGROUND INFORMATION

Many state of the art helicopters have a tank system that comprises, among other things, two tank containers. Both tank containers, which are also termed the main tank and the extraction tank or fuel feed tank, are arranged within a subfloor structure, whereby the subfloor structure is attached between the floor and the bottom shell of the fuselage. The main tank and extraction tank are arranged in the same plane and in a row one behind the other in the subfloor structure, with reference to the lengthwise axis of the helicopter. The main tank and extraction tank are connected via a connecting channel by a pump. Both tanks are also connected to each other via an overflow channel. The main tank has a much larger capacity. The extraction tank lies behind the main tank toward the rear of the helicopter. A fuel supply line leads from the extraction tank to the main engine of the helicopter, for supplying fuel from the extraction tank to the engine.

The main tank and extraction tank have a self-sealing ventilation valve that is connected to a breathing channel for the inflow and outflow of air. This breathing channel is directly above the top edge of the tank containers. The breathing channel can therefore fill up with fuel when the tank is full and there is a slight tilt to the tank containers. Such a known ventilation valve is described in German Patent 198 44 264 C1. The ventilation valve has a device to seal the breathing channel from the tank container when a crash impact causes the release or disruption of a connecting means between the fuselage cell (floor) and the tank container. The disadvantage of the state of the art arrangement is that the tank container of the helicopter with the prior art ventilation valve cannot be completely filled with fuel, so that the actual capacity of the tank containers cannot be fully utilized even though it is available as empty tank volume.

Due to the angle of the landing frame of a resting helicopter in relation to the surface on which it rests, the main tank and extraction tank are also angled or tilted relative to a horizontal plane when the helicopter rests on a horizontal surface. Particularly, the main tank is somewhat higher than the extraction tank.

When the helicopter is filled up with fuel while it is standing, fuel runs into the breathing channel (sometimes termed "the channel" herein for short reference) due to the angle of the helicopter, and can block the breathing channel. In a typical conventional tank arrangement, the middle of a ventilation line is only a few millimeters (approximately 12 mm) above the top edge of the tank container or approximately 28 mm above the level of the ventilation holes. With this arrangement, the ventilation channels are filled with fuel when a full tank container is at a slight angle.

When the tank container is completely full, this problem also arises in forward horizontal flight when the extraction tank is somewhat higher than the main tank due to the flight position.

There is another familiar problem. When a filled-up helicopter stands for a while in the heat or is subjected to rapid temperature changes during flight, liquid fuel settles in the breathing channel due to the condensation of fuel vapor.

When there is too much fuel in the channel, the proper ventilation functioning of the breathing channel can be disturbed or interrupted.

SUMMARY OF THE INVENTION

In view of the above it is an object of the invention to allow the tank container of a helicopter to be filled essentially full, and to ensure the ongoing reliable functioning of the breathing channel. The invention further aims to avoid or overcome the other disadvantages of the prior art, and to achieve additional advantages, as are apparent from the present specification.

The above objects have been achieved according to the invention in a tank arrangement for a helicopter, including a first tank, a second tank, a first breathing channel connected to the first tank, a second breathing channel connected to the second tank, a connecting channel that connects and intercommunicates the first and second breathing channels with each other, and a first ventilation valve interposed between the first tank and the first breathing channel. The first ventilation valve includes a valve housing, and a device arranged in the housing to seal the valve or particularly the flow passage to the first breathing channel when a mechanical connection of the first tank is released from the first tank. The first ventilation valve further includes a movable seal comprising a valve ball that is so adapted and arranged to selectively seal the first breathing channel dependent on and responsive to the level of fuel in the first tank.

Particularly, the valve ball is a buoyant valve ball that buoyantly floats upward in or on the fuel as the level thereof rises into the first ventilation valve. This causes the valve ball to seal an opening or port from the first ventilation valve into the first breathing channel when the first tank is substantially full with fuel. Preferably, the valve ball can move freely through a stroke path in the hollow cylinder area within the valve housing extending from the safety device to the port opening of the valve into the breathing channel. In order to seal the port opening, the diameter of the valve ball is larger than that of the port opening.

The second tank may further be equipped with a second ventilation valve. This second ventilation valve of the second tank may have the same construction and arrangement as the first valve, or may be a simpler valve that includes the above mentioned safety device, but does not include the above-mentioned valve ball as the seal element. Thus, the second valve provided on the second tank and communicating into the second breathing channel will mechanically close the flow passage in the event of a disconnection of the tank from its mounting structure (e.g. due to a crash), but will not close or seal the valve as a result of the full fuel level of the second tank.

With the inventive arrangement, the tank containers can be filled completely without endangering the breathing of the tank system. The ventilation valve according to the invention is arranged in the extraction tank (i.e. the above mentioned first tank is preferably the extraction tank), while the second tank i.e. the main tank may still be equipped with the prior art ventilation valve. The invention also ensures that condensed fuel will not endanger the breathing or ventilation of the tank system. Even in flight and especially horizontal flight, at least one of the two ventilation channels will be available for the tank system to breath.

BRIEF DESCRIPTION OF THE DRAWINGS

In order that the invention may be clearly understood, it will now be described in connection with example embodiments, with reference to the accompanying drawings, wherein:

FIG. 3 is a detail sectional view of a ventilation valve according to the invention; and FIG. 4 is a partial view of a connecting channel according to the invention.

DETAILED DESCRIPTION OF PREFERRED EXAMPLE EMBODIMENTS AND OF THE BEST MODE OF THE INVENTION

Figure 1:
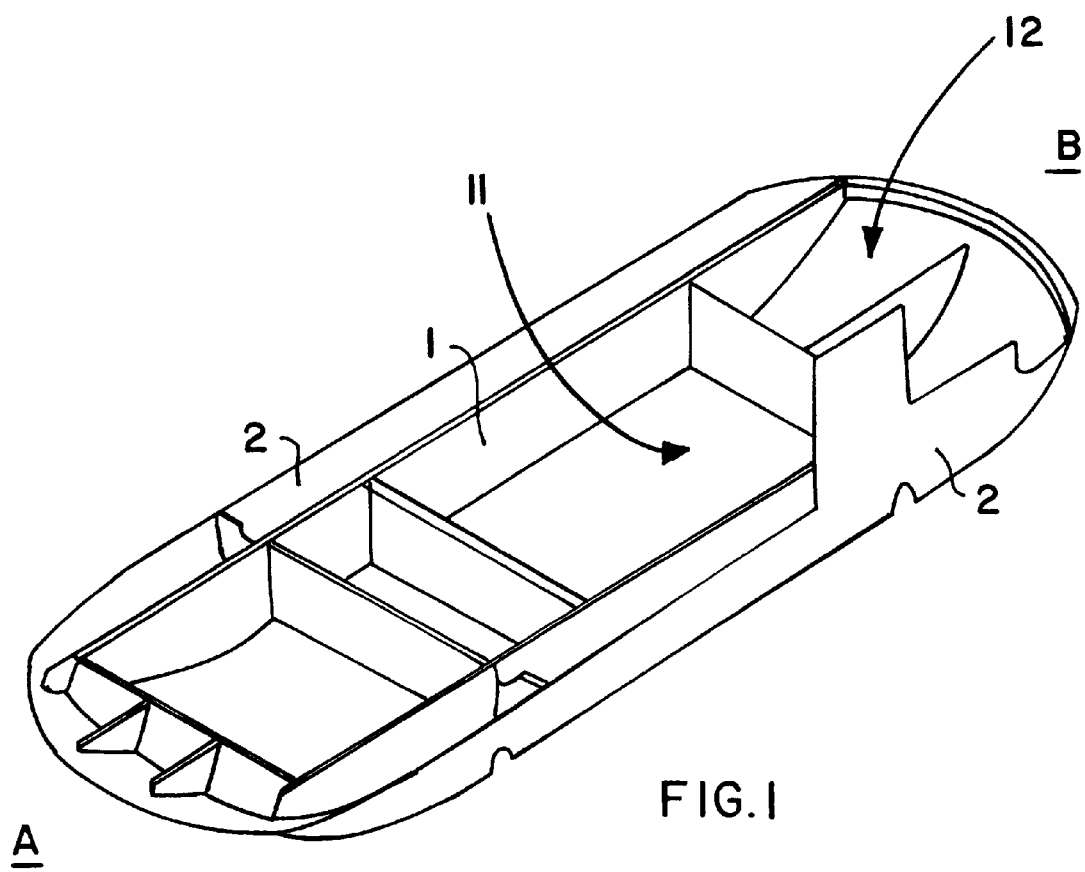
FIG. 1 is a schematic perspective view of chambers to receive the tank containers in the subfloor structure of a helicopter.

FIG. 1 shows the subfloor structure 1 on the bottom shell 2 of the fuselage of a helicopter. The subfloor structure 1 has several chambers along its length from the tail B to the nose A. The main fuel tank is in chamber 11, and the fuel extraction or discharge tank is in chamber 12. Chamber 12 is at the tail B of the helicopter.

Figure 2:
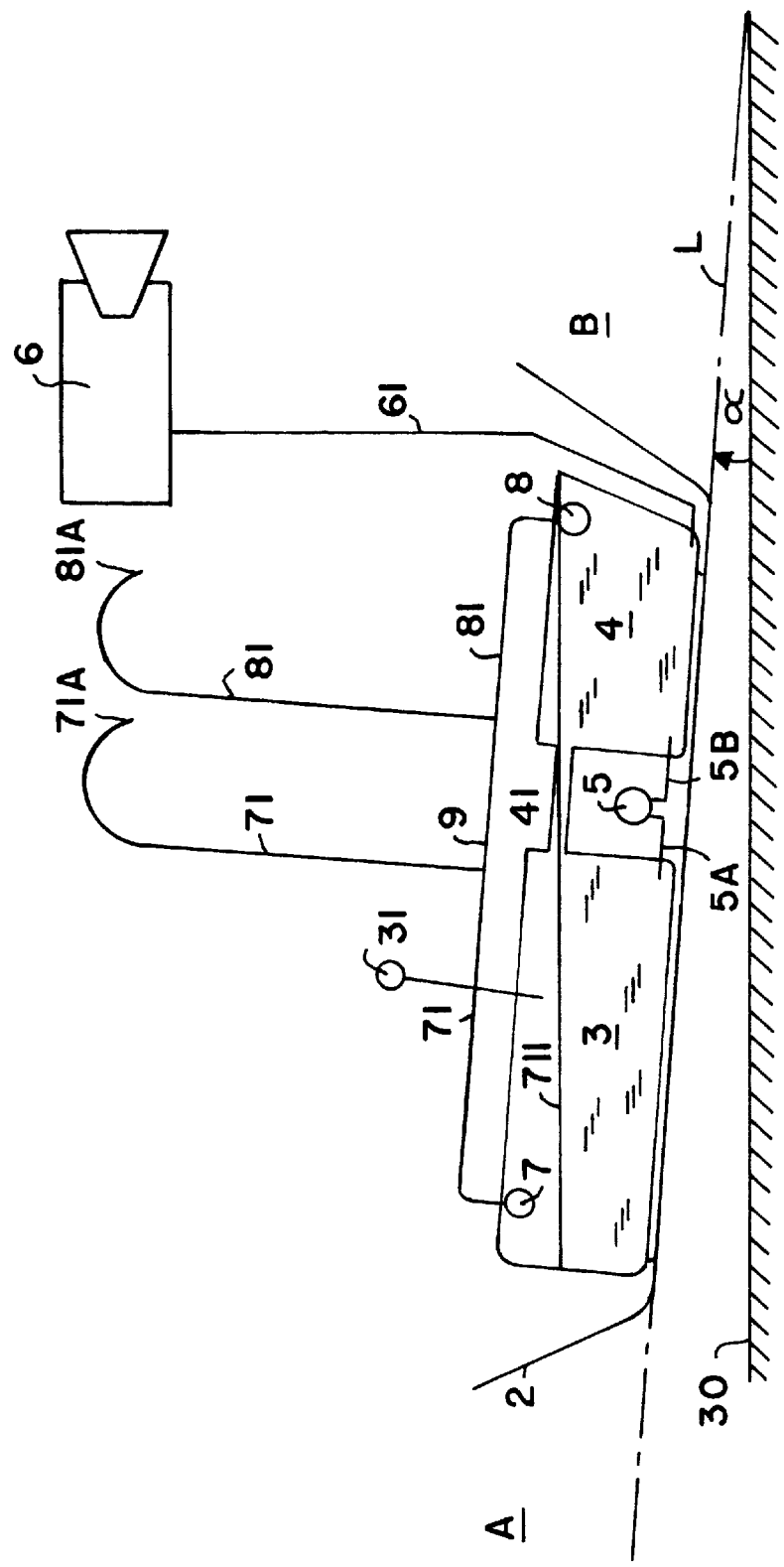
FIG. 2 diagramatically illustrates the angle of the tank containers in relation to the resting surface on which a helicopter rests.

FIG. 2 schematically portrays the angle a of the lengthwise axis L of a helicopter standing on a resting surface 30 such as the ground. The bottom shell 2 represents the outer bottom contour of the helicopter. Lying on the shell 2 are the main tank 3 and the extraction or discharge tank 4. Both tanks are within the subfloor structure 1, i.e. received in the respective chambers between the components thereof (not shown in FIG. 2). The filler neck 31 for filling fuel into the tanks is connected to the main tank 3. A fuel pump 5 with connecting lines 5A and 5B connects the main tank 3 with the extraction tank 4. This ensures that the extraction tank 4 is always full, and that the main tank 3 is emptied first during flight. Furthermore, the main tank 3 and the extraction tank 4 are connected at their top area by means of an overflow line 41. This allows the fuel to be balanced between the tanks depending on flight-position-related changes of the fuel level. From the extraction tank 4, a fuel line 61 leads to the engine 6. If there are two engines, both are supplied via a fuel line from the extraction tank 4.

The main tank 3 and extraction tank 4 each have a respective self-sealing ventilation valve 7 and 8 with a breathing channel 71, 81 connected respectively thereto. Both breathing channels 71, 81 end outside at open ends 71A, 81A. Both ventilation valves 7, 8 help the tank container breath. The ventilation valves 7, 8 are self-sealing in case of a crash. For example, the valves 7, 8 may each include a spring-loaded plunger (e.g. 15B in FIG. 3) as well as a retainer (e.g. 22 in FIG. 3) that normally restrains the plunger in an open position against the urging force applied by the biasing spring (15A) in FIG. 3). In the event of a crash, the retainer is released, which thus releases the plunger and allows the biasing spring to move the plunger and therewith push a seal element into a closed position in which the seal element closes the port of the valve leading into the connected breathing channel. Alternatively, the self-sealing structural arrangement and function of the valves can be according to any conventionally known teachings.

Only the extraction tank 4 has the further developed ventilation valve 8 according to the invention. This illustrates that, of the two tank containers 3 and 4, only the extraction tank 4 is equipped with the ventilation valve 8 according to the invention.

On the other hand, the ventilation valve 7 provided on the main tank 3 may be a conventional ventilation valve as described above with regard to the state of the art. This combination of valves allows both tank containers to be completely filled without hindering breathing.

The inventive ventilation valve 8 has a device 15 to seal the breathing channel 81. This device 15 has a seal that provides a seal for two different functions. The first function is to seal the port opening 21 in the event of a crash (much as described above with regard to the conventional valves and present valve 7). The second function is to seal the port opening 21 in the event the fuel level rises up into the valve 8. FIG. 3 shows the ventilation valve 8 according to the invention that. combines the two functions.

The valve 8 incorporates a self-sealing device 15 that serves to seal the breathing channel 81 if the tank container 4 should release from the retention or mounting structure 18 in a crash. The device 15 can e.g. be equipped with a plunger 15B (for example as disclosed in German Patent 198 44 264) that is pre-tensioned with a spring 15A. The device 15 (only schematically portrayed) is mounted in the valve housing 14, and is retained in a position against the pre-biasing force of the spring 15A by a retainer 22 (shown schematically), which releases if the tank container separates from the mounting structure 18. The plunger 15B is thus only moved outwards into the cylinder area 19 (toward the port opening 21 of the channel 81) by the spring 15A in a crash or the like. When the valve housing 14 separates from the structure 18 in a crash or the like, the retainer 22 is released and the spring 15A pushes the plunger 15B into the cylinder area 19, whereby the plunger in turn pushes the seal element of the valve to block the fuel flow passage therethrough. This cylinder area 19 has at least one port opening 20 into the interior of the tank container 17.

According to the invention, the seal element of the valve is a valve ball 10 that is also arranged in the cylinder area 19. This seal ball 10 can have two functions. In a crash, the device 15 presses the valve ball 10 against the opening 21 of the breathing channel 81 by means of a released spring and plunger. The channel 81 therefore can be continuously closed in the event of a crash. The plunger serves to move the valve ball 10 that assumes the sealing function.

Otherwise, the valve ball 10 remains freely mobile in the cylinder area 19. Depending on the fuel level, e.g. with a high fuel level when the tank is substantially full, fuel passes through the opening 20 into the cylinder area 19 so that the valve ball 10 can move from an open state (shown by solid lines) to a closed state 100 (shown by dashed lines) and back by its own buoyancy. In the closed state 100, the valve ball 10 blocks and closes the port opening 21 of the valve, which communicates into the channel 81. Thus, by means of a simple constructive measure, no liquid fuel directly enters the channel 81 when the tank is substantially completely filled (e.g. filled to a level at which fuel enters the openings 20 and buoys up the valve ball 10 into the closed position 100). The channel 81 runs above the top edge of the tank container for reasons of space and hence is integrated in the bracing or mounting structure 18 (corresponding to the floor of the fuselage cell).

When the tank container is filled, the fuel level 711 (FIG. 2) is slightly below the ventilation valve 7. Since the breathing channels 71, 81 run basically just above the top edge of the tank containers 3, 4, the ventilation valve 8 equipped with the valve ball 10 prevents fuel from rising into the breathing channel 81 when the tank 4 is filled. It also prevents the fuel from passing from channel 81 via connecting channel 9 into channel 71. Thus, it prevents channels 81 and 71 from being blocked by the rising fuel level, which would prevent the existing air bubble in the main tank from escaping, which in turn would prevent the tank from being completely filled up. This illustrates the importance of the ventilation valve 8 according to the invention in the tank system. The two tank containers can be filled completely when the ventilation valve according to the invention 8 is used, because proper venting is ensured throughout the entire tank-filling process to the point of the tanks being completely filled.

Evaporated fuel from the main tank 3 can collect in the breathing channel 71 as a condensate. To prevent this, the liquid fuel from channel 71 is guided into the connecting channel 9 and sent from there to channel 81, from which the fuel runs back into the extraction tank 4. This prevents condensed fuel from collecting in channel 71, which reliably keeps the breathing channel 71 free so that air from the atmosphere can be guided via channel 71 and ventilation valve 7 into the tank 3. The design detail is shown in FIG. 4. The connecting channel 9 connects the breathing channel 71 directly to the ventilation channel 81. The connecting channel 9 is not in a different location or a different level than channels 71 and 81, but rather is directly in line therewith. This ensures the ongoing functioning of the breathing channel 71 to ventilate the main tank 3 when there is a full tank. This intermediate connecting channel 9 offers a simple design and economical way of improving the breathing and allowing the tank containers to be completely filled.

When the helicopter is in horizontal forward flight, the extraction tank 4 is higher than the main tank 3. When the tank is still rather full, fuel flows from the extraction tank 4 via the overflow 41 into the main tank 3. Remaining fuel in channel 81 flows via connecting channel 9 into channel 71. Since the ventilation valve 7 does not have a valve ball 10, either fuel can collect in channel 71, and channel 81 assumes the breathing function of the tank system depending on the fuel level, or the remaining fuel flows out of channel 81 via valve 7 into the main tank 3 when the fuel level is low from fuel consumption. If the fuel level drops during flight, the remaining fuel in channel 81 can return to the main tank 3 via channel 71 and open valve 7 due to an alternating horizontal flight position. Alternatively, if the fuel level in the extraction tank 4 is low enough (below the level of the valve 8), the fuel can also flow back into the extraction tank 4 if the system is tilted with the extraction tank 4 downward. In this manner, it can always be ensured that a clear breathing path is maintained for properly ventilating the tanks in all flight attitudes and with all tank filling levels.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A fuel tank arrangement for a helicopter, comprising:
   a first fuel tank;
   a first breathing channel having a first tank end connected to an upper portion of said first fuel tank and a first venting end communicating with the atmosphere;
   a second fuel tank;
   a second breathing channel having a second tank end connected to an upper portion of said second fuel tank and a second venting end communicating with the atmosphere;
   a connecting channel that is connected to and communicates between said first breathing channel and said second breathing channel;
   a first mechanical connection adapted to connect said first fuel tank to the helicopter; and
   a first ventilation valve interposed and communicating between said first fuel tank and said first tank end of said first breathing channel;
   wherein:
   said first ventilation valve comprises a first valve housing with a first tank port communicating into said first fuel tank, a first breathing port communicating into said first tank end of said first breathing channel, and a first interior chamber communicating between said first tank port and said first breathing port;
   said first ventilation valve further comprises a first safety shut-off device that includes a movable valve seal ball arranged in said interior chamber of said valve housing;
   said first safety shut-off device mechanically cooperates with said mechanical connection so as to be adapted to close at least one of said first tank port and said first breathing port responsive to said mechanical connection being disrupted; and
   said valve seal ball is arranged and adapted to close said first breathing port dependent on and responsive to a level of fuel provided in said first tank.

2. The fuel tank arrangement according to claim 1, wherein said valve seal ball is a buoyant ball adapted to float in or on the fuel when the fuel enters said interior chamber of said first valve housing.

3. The fuel tank arrangement according to claim 1, wherein said valve seal ball is adapted to move along a stroke path from said first safety shut-off device toward and to said first breathing port.

4. The fuel tank arrangement according to claim 1, wherein said interior chamber of said first valve housing is an open cylinder, and said valve seal ball is arranged and adapted to move freely without restriction within said open cylinder.

5. The fuel tank arrangement according to claim 1, wherein said valve seal ball has a larger diameter than said first breathing port.

6. The fuel tank arrangement according to claim 1, wherein said first safety shut-off device further includes a plunger and a spring, said valve seal ball is arranged in said interior chamber between said plunger and said first breathing port, said spring is arranged to spring-load said plunger and urge said plunger in a direction toward said valve seal ball, and said plunger is normally restrained against said spring-load by said mechanical connection and is released so as to push said valve seal ball against said first breathing port when said mechanical connection is disrupted.

7. The fuel tank arrangement according to claim 6, wherein said valve seal ball is not connected to said plunger, and is free to move independently of said plunger.

8. The fuel tank arrangement according to claim 1, further comprising a second ventilation valve interposed and communicating between said second fuel tank and said second tank end of said second breathing channel.

9. The fuel tank arrangement according to claim 8,
wherein said second ventilation valve comprises a second valve housing with a second tank port communicating into said second fuel tank, a second breathing port communicating into said second tank end of said second breathing channel, and a second interior chamber communicating between said second tank port and said second breathing port,
wherein said second ventilation valve further comprises a second safety shut-off device including a second plunger, a second spring arranged to spring-load said second plunger and urge said second plunger in a direction toward said second breathing port, and a seal element connected to said second plunger and adapted to close said second breathing port when said second plunger is moved by said second spring;
wherein said second plunger is normally restrained against said spring-load of said second spring by a second mechanical connection adapted to connect said second tank with the helicopter and is released so as to push said seal element against said second breathing port when said second mechanical connection is disrupted; and
wherein said seal element is not a buoyant seal ball.

10. The fuel tank arrangement according to claim 1, wherein:
said first breathing channel includes a first tank end channel portion adjoining said first tank end, and a first venting end channel portion adjoining said first venting end,
said connecting channel is connected to said first breathing channel between said first tank end channel portion and said first venting end channel portion,
said second breathing channel includes a second tank end channel portion adjoining said second tank end, and a second venting end channel portion adjoining said second venting end, and
said connecting channel is connected to said second breathing channel between said second tank end channel portion and said second venting end channel portion.

11. The fuel tank arrangement according to claim 10, wherein said first tank end channel portion, said connecting channel, and said second tank end channel portion are all aligned with each other along a straight line.

12. The fuel tank arrangement according to claim 1, wherein said first fuel tank is a relatively smaller fuel extraction tank, and said second fuel tank is a relatively larger main fuel tank.

13. A ventilation valve for a fuel tank comprising:
a valve housing with a first port, a second port, and an internal chamber communicating between said first and second ports;
a plunger movably arranged in said internal chamber;
a buoyant valve seal ball arranged in said internal chamber between said plunger and said second port, wherein said valve seal ball is not connected to said plunger, is free to move in said internal chamber independently of said plunger, is so dimensioned, configured and arranged so as to be adapted to seal said second port when said valve seal ball is in a sealing position, and is buoyantly able to float on a fuel into said sealing position if the fuel enters said internal chamber;
a spring arranged to spring-bias said plunger in a direction toward said valve seal ball and said second port so as to push said valve seal ball into said sealing position; and
a retainer that normally retains said plunger against said spring-bias of said spring and that is adapted to be released so as to free said plunger to be moved by said spring bias such that said plunger moves said valve seal ball into said sealing position.

* * * * *

UNITED STATES PATENT AND TRADEMARK OFFICE
CERTIFICATE OF CORRECTION

PATENT NO. : 6,439,506 B1 Page 1 of 1
DATED : August 27, 2002
INVENTOR(S) : Schlegel et al.

It is certified that error appears in the above-identified patent and that said Letters Patent is hereby corrected as shown below:

Column 3,
Line 36, after "angle", replace "a" by -- α --.

Signed and Sealed this

Tenth Day of December, 2002

JAMES E. ROGAN
*Director of the United States Patent and Trademark Office*